March 5, 1957 — E. J. WILHELM — 2,783,731
RETRIEVING DEVICE
Filed July 27, 1955

*INVENTOR.*
EDWARD J. WILHELM
BY
ATTORNEYS

United States Patent Office 2,783,731
Patented Mar. 5, 1957

2,783,731

RETRIEVING DEVICE

Edward J. Wilhelm, Philadelphia, Pa.

Application July 27, 1955, Serial No. 524,757

3 Claims. (Cl. 116—124)

This invention relates to a retrieving device and, more particularly, to a device facilitating the locating and retrieving of submerged articles.

There are numerous commonly known situations where persons working in or over water with portable appliances may inadvertently release or drop the appliance into the water with the ensuing difficulty of locating and retrieving the dropped appliance. In some instances it may be substantially impossible to retrieve the articles due to possible adverse conditions of the waters.

It is the principal object of this invention to provide a simple attachment for such appliances which provides, if the appliance is dropped into the water, for the release of a float connected to the appliance by a length of line sufficient to permit the float to reach the surface of the water and to thus indicate the location of the appliance and facilitate recovery of the appliance. The attachment is particularly desirably employed in connection with the use of devices such as fishing rods, hunting equipment and various tools which may be employed, for example, around docks, wharves, rafts, boats and the like.

Figure 1:
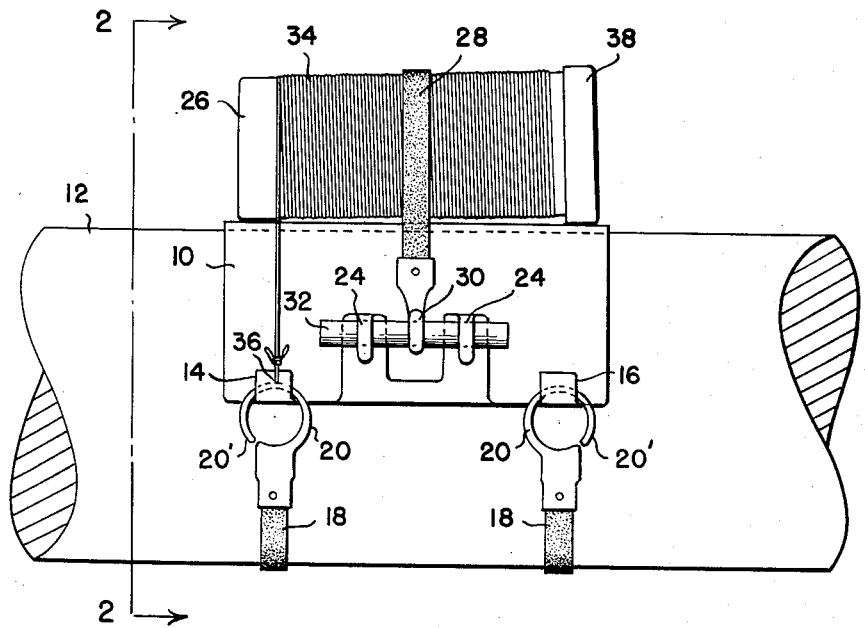
Figure 2:
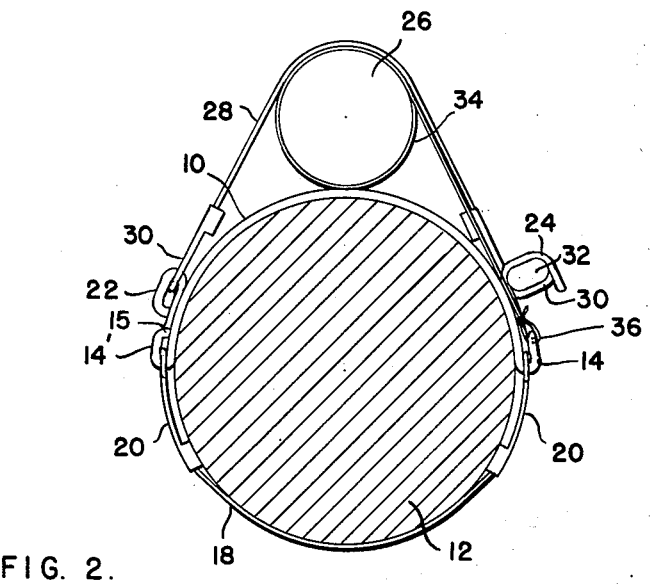

The foregoing and other objects of the invention will become apparent from the following description when read in conjunction with the accompanying drawings in which:

Figure 1 is a side elevation showing the apparatus in position on a fragmentary portion of a fishing rod; and Figure 2 is a transverse section through the apparatus taken on the plane indicated at 2—2 in Figure 1.

In the drawings there is shown a plate 10 partially encircling a fishing rod 12. The plate 10 may be formed of any suitable material such as aluminum, stainless steel, molded plastic or other type of light reasonably corrosion resistant material which may be provided with oppositely disposed pairs of hooks 14—14' and 16—16', the hook 16' lying behind the hook 14' in Figure 2 and thus not visible in the drawing. The hooks 14' and 16' are closed against the plate 10 as indicated at 15 in Figure 2. The hooks 14 and 16 are open hooks.

Elastic bands 18 which are preferably made of rubber are provided at their ends with ring hooks 20. The hooks of one of the bands 18 engage the hooks 14 and 14' of the plate 10 and the hooks of the other of the bands 18 engage the hooks 16 and 16' of the plate 10. It will be evident that the elastic bands 18 will serve to secure the plate 10 to the fishing rod 12 or other appliance. Elastic bands provided with hooks at each end are preferably employed in order that bands of proper band length may be selected depending upon the diameter of the appliance to which the device is to be attached. The closed arrangement of inter-engaging hooks 14'—20 and 16'—20 prevents accidental separation of the bands 18 from the plate 10. However, the end portions 20' of the ring hooks 20 may be deflected to open the hooks to permit replacement of the hooks 20 in the closed plate hooks 14' and 16'.

The portion of the plate 10 intermediate the hooks 14' and 16' is provided with a closed hook 22 and the portion of the plate 10 intermediate the hooks 14 and 16 is provided with a pair of spaced hooks 24. A float 26 which may preferably be in the form of a container, as will be hereinafter described, is held into engagement with the plate 10 by means of an elastic band 28 provided at its ends with hooks 30 and 30'. The hook 30' is a ring hook similar to the ring hooks 20 and engages the closed hook 22. The hook 30 is adapted to fit between the two hooks 24 on the plate 10 and be secured in relative position therewith by means of a strip or block of material 32 which extends across between the two hooks 24 and provides a surface for engagement by and for restraint of the hook 30 of the elastic member 28 positioned between the hooks 24. This block is formed of a water soluble material such as a salt, a medicinal tablet such as, for example, an aspirin tablet or the like, or other suitable soluble material having sufficient strength to hold the elastic band 28 in stretched condition over the float 26.

The float 26 has wound thereon a suitable length of line, such as a fishing line, of relatively light weight and of adequate strength to lift the fishing rod 10 or other article to which the float is attached when the article is submerged in water. The innermost end of the line 34 is affixed to the float 26 and the outermost end of the line is connected, as indicated at 36, to the hook 14 of the plate 10. From the foregoing it will be evident that with the retrieving device attached to a fishing rod, if the rod should be inadvertently dropped into a body of water, the water soluble bar or block 32 will dissolve and the tension of the elastic band 28 pulling against the bar 32 will, within a short time interval, pull the hook 30 through the bar 32 thus releasing the float 26 which will float to the surface unwinding the line 34 wound thereon as it floats to the surface where it will be visible and may be retrieved by the person who has dropped the rod or other appliance to which the retrieving device is attached. The float 26 is preferably in the form of a container having a removable water-tight cap 38 and within which there may be stored a supply of the soluble bars or blocks 32 in order that these bars may be replaced whenever they become inadvertently moistened and their strength thus becomes impaired.

The supply of soluble bars or blocks contained within the float 26 may, if desired, be enclosed in an additional moistureproof container. The float 26 is desirably colored with a suitable bright attractive color to improve its visibility.

From the foregoing it will be evident that the invention provides a simple, practical and inexpensive retrieving device which may be employed with a great variety of types of apparatus used over water. It should also be noted that, if desired, the float and the elastic band 28 securing the float to the device may be positioned on the opposite side of the rod 12 from the plate 10. If, however, the device is intended for use with articles of various sizes, the arrangement shown is preferable for the reason that only a single elastic band 28 need be provided to hold the float in position on the plate 10 while various lengths of elastic members 18 may be provided for securing the device to articles having various circumferential dimensions.

If desired, the bands 18 may be made of sufficient length to permit passing them around a large article in the manner shown in the drawing and, when the device is attached to a small article, the bands may be passed around the article two or more times to provide suitable band tension for securing the device to the small article.

When the device is not in use, the float 26 may be conveniently positioned inside of the plate 10 in the position occupied by the article 12 shown in the drawing, thus minimizing the space required for storage of the device.

It will be noted that the line 34 may be connected, as shown at 36 in Figure 2, to the plate 10 or may, alternatively, be connected directly to the article to which the plate is attached. It will be evident that hereinafter, when reference is made to a line for connecting the float to the article, the language is to be construed as including connection of the end of the line 34 directly to the article to which the apparatus is attached or connection of the line to the article through the plate as shown in the drawing.

It will be evident that these and other modifications may be made to the apparatus described without departing from the invention as set forth in the following claims.

What is claimed is:

1. A retrieving device for submerged articles comprising a member adapted to be secured to an article, means attached to said member for securing said member to an article, a float, an elastic member embracing said float securing said float in fixed relation with the article to which said first mentioned member is secured, means releasably attaching said elastic member to said first mentioned member, said releasable attaching means including a hook attached to one of said members positioned between a pair of hooks attached to the other of said members and a water soluble element transferring loading between said hook and said pair of hooks, and a line carried by said float for connecting said float to the article.

2. A retrieving device comprising a plate, an elastic member and separable hook means for securing the elastic member to said plate for attaching the plate to articles of various sizes, a float, a line carried by said float and having one end secured to said float and the other end adapted to be secured to said plate, a second elastic member embracing said float, and means securing said second elastic member to said plate attaching said float to said plate, said last mentioned securing means including a water soluble element releasing said securing means upon dissolution thereof.

3. A retrieving device comprising a plate member, an elastic member and separable hook means for securing the elastic member to said plate member for attaching the plate to articles of various sizes, a float, a line carried by said float and having one end secured to said float and the other end adapted to be secured to said plate member, a second elastic member embracing said float, and means securing said second elastic member to said plate attaching said float to said plate member, said last mentioned securing means including a single hook attached to one of said members positioned between a pair of hooks attached to the other of said members and a water soluble element transferring loading between said hook and said pair of hooks releasing said securing means upon dissolution thereof.

References Cited in the file of this patent

UNITED STATES PATENTS

| | | |
|---|---|---|
| 1,719,838 | Haselton | July 9, 1929 |
| 2,190,531 | Kaboskey | Feb. 13, 1940 |
| 2,419,162 | Pofe | Apr. 15, 1947 |